June 8, 1971  YOSHIAKI MIWA ET AL  3,583,863

SEALING APPARATUS FOR USE IN THE MANUFACTURE OF FLAT GLASS

Filed Oct. 21, 1968

YOSHIAKI MIWA AND HIDEO MITSUNO,
Inventors

By Wenderoth, Lind & Ponack.
Attorneys

United States Patent Office 3,583,863
Patented June 8, 1971

3,583,863
SEALING APPARATUS FOR USE IN THE MANUFACTURE OF FLAT GLASS
Yoshiaki Miwa and Hideo Mitsuno, Kyoto-fu, Japan, assignors to Nippon Sheet Glass Co., Ltd., Osaka, Japan
Filed Oct. 21, 1968, Ser. No. 769,232
Claims priority, application Japan, Oct. 24, 1967, 42/90,278
Int. Cl. C03b 18/00
U.S. Cl. 65—182R
4 Claims

ABSTRACT OF THE DISCLOSURE

An apparatus for removing from a bath of molten metal protected with a protective atmosphere of non-oxidising gas, a ribbon of glass manufactured atop said bath and conveying said ribbon of glass to a lehr, said apparatus comprising at least one roll for conveying the ribbon of glass, and sealing means mounted at the underside of said roll so as to contact the roll along its length and adapted to prevent the ingress of external atmosphere from under the roll into the protective atmosphere, characterized in that said sealing means comprises anhydrous gypsum having inorganic fibers dispersed therein.

---

This invention relates generally to an apparatus for removing from a bath of molten metal flat glass manufactured in ribbon form atop said bath and which glass is conveyed to a lehr and more specifically relates to an improved sealing composition used in association with the apparatus.

In the so-called floating method of manufacturing flat glass wherein a ribbon of glass is continuously formed by flowing molten glass onto a bath of molten metal, it is the general practice to charge the headspace over the bath of molten metal with a plenum of protective atmosphere consisting of non-oxidising gas for preventing the oxidation of the molten metal. In order to maintain this plenum of protective atmosphere consisting of non-oxidising gas, in most cases it has been proposed to provide at the outlet of the bath of molten metal a member consisting of carbon which is so disposed as to be in sealing engagement with the glass ribbon conveying roll at the underside thereof (see British patent specification No. 1,017,753).

However, since that part opposite from the molten metal bath side of the aforesaid carbon contacting member is exposed to an oxidizing atmosphere of several hundred degrees centigrade, the carbon becomes burnt and hence its continuous use over a prolonged period of time was impossible.

The present invention provides an apparatus which is adapted to remove from a bath of molten metal a ribbon of glass made atop said bath which is protected with a protective atmosphere of non-oxidising gas and then convey said ribbon of glass to a lehr, said apparatus comprising at least one roll for conveying the ribbon of glass and a sealing member mounted at the underside of said roll so as to contact the roll along its length and adapted to prevent the ingress of external atmosphere from under the roll into the protective atmosphere, characterized in that said sealing member comprises anhydrous gypsum having inorganic fibers dispersed therein.

Figure 1:
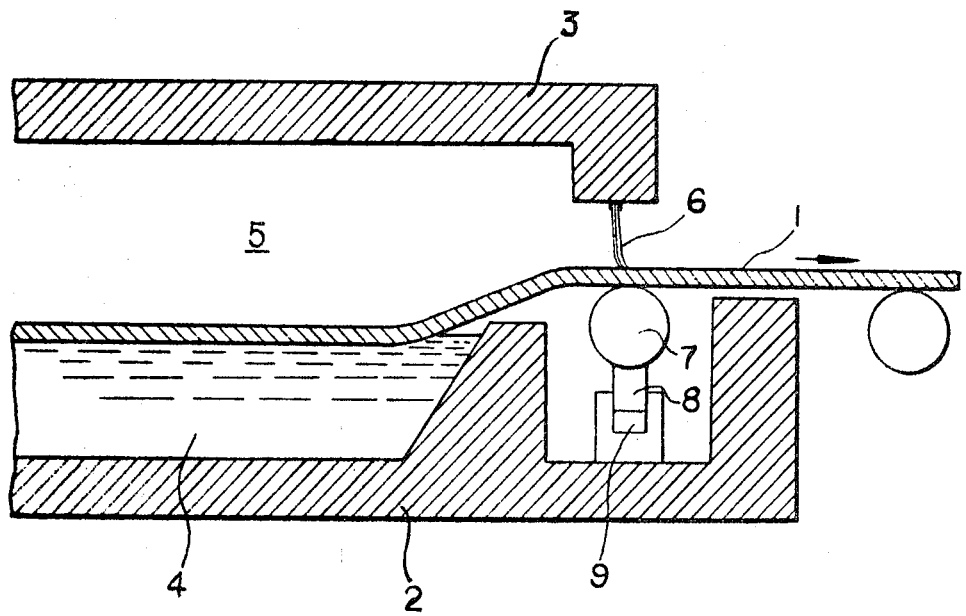
Figure 2:
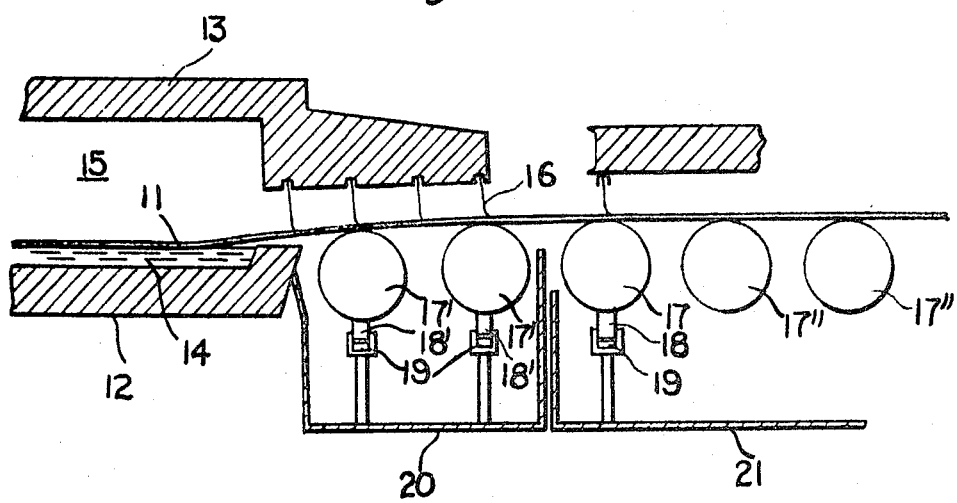

Referring to the accompanying drawings, FIG. 1 is a schematic view in vertical section illustrating an embodiment of the present invention; and FIG. 2 is a similar view illustrating another embodiment of the invention.

In FIG. 1, the ribbon of glass 1 manufactured atop a molten metal bath 4 is removed from said bath by means of an apparatus according to the present invention and is conveyed to a lehr (not shown). Reference numeral 2 denotes the tank structure which contains the molten metal bath 4 and 3 denotes the roof structure of the bath. Headspace 5 over the bath 4 is filled with a non-oxidising atmosphere for protecting the bath. For sealing the outlet of the bath against ingress of external atmosphere into the headspace 5 at the upside of the ribbon 1, a draper 6 of heat-resistant cloth depends onto the ribbon 1 from the end portion of the roof structure 3. The end portion of the tank structure 2 is prolonged and, as shown in FIG. 1, forms a pit. Ribbon 1 is removed and conveyed from the bath 4 by means of a steel roll 7 disposed in the pit. Sealing member (or contacting member) 8 is mounted at the underside of the roll 7 so as to be in contact with the roll along its length, thus preventing the ingress of external atmosphere into the headspace 5 from the underside of the roll. Spring 9 is the resilient means by which the sealing member 8 is resiliently urged into sealing engagement with the bottom of the roll 7.

Sealing member 8 consists of a unitary body of anhydrous gypsum in which has been dispersed inorganic fibers. As the inorganic fibers, preferred are such as glass fiber, asbestos wool and other heat-resistant inorganic fibers of a diameter about 5 to about 40 microns and a length of about 5 to about 100 mm. These inorganic fibers can be incorporated in the anhydrous gypsum matrix in amount of about 1 to 15% by weight based on the total weight. Sealing member 8 to be used in the present invention can be made by mixing calcined gypsum, the inorganic fiber and water in the proper proportions, then placing this mixture in a mould and solidifying it at ambient temperature, followed by predrying if desired, and thereafter dehydrating at a temperature ranging from about 100° C. to about 700° C. If the temperature at the time of dehydration is too high, the mechanical strength of the resulting sealing member suffers. The product obtained by dehydration at the temperature range indicated above in its as-obtained state is believed to consist of either the III or II type anhydrous gypsum containing the inorganic fibers dispersed therein.

By way of example, commercially available gypsum, glass fibers (diameter about 5 to 10 microns, length about 20 to 60 mm., 70.0% $SiO_2$, 2.5% $Al_2O_3$, 7.5% CaO, 3.0% MgO, 2.0% $B_2O_3$, 14.5% $Na_2O$, 0.5% $K_2O$) and water were mixed in a weight ratio of 20:1:12, placed in a wooden mould of suitable dimension and solidified, following which the hardened product was removed from the mould and conditioned for several days at about 50° C. After trimming the shape of the resulting product and prior to its use in the apparatus of the present invention, it was backed for about 30 minutes at about 400° C.

A contacting member made in this manner excels in heat resistance as well as resistance to oxidation and hence can stand a prolonged period of use. In addition, it also has the effect of removing the molten metal and other matter that may be adhering to the roll 7 which conveys the glass ribbon 1.

FIG. 2 is a schematic view in vertical section illustrating a preferred embodiment of the present invention, the glass ribbon 11 manufactured atop the molten metal bath 14 is removed from the bath 14 by means of the apparatus according to the present invention comprising rolls 17', 17' and 17 and is conveyed to lehr rolls 17", 17" disposed inside the lehr. The reference numeral 12 denotes the tank structure containing the bath 14, while 13 denotes the roof structure of the bath 14. The headspace 15 over the bath 14 is filled with an atmosphere of non-oxidising gas. The end portion of the roof structure is prolonged in the direction of the bath outlet to a greater distance than the corresponding end portion of the tank structure, and four drapers 16 of heat-resistant cloth depend to the top of the ribbon 11 from this prolonged end portion to thereby seal the outlet at the upper side of the ribbon against the ingress of external atmosphere into the headspace 15. At below the ribbon 11 a box 20 is provided between the tank structure 12 of the bath 14 and a bottom structure 21 of the lehr. The end wall of the box 20 on that side near the bath is in adjacency to the end wall of the tank structure and likewise the end wall of the box 20 at the other side is in adjacency to the end wall of the bottom structure 21 of the lehr. FIG. 2 shows that there exists a slight clearance between the end wall of the bottom structure of the lehr and the end wall of the box 20 at the side near said bottom structure. Since the tank structure 12 expands as a result of the operating temperature of the bath, the box 20 is pushed towards the lehr and this clearance disappears. A minimum clearance that remains at this time is sealed with a sealing agent. In FIG. 2 the first two rolls 17′ are disposed inside the box 20 filled with the non-oxidising atmosphere, whereas the third roll 17 is disposed inside the lehr. At the underside of the roll 17 there is mounted a sealing member (or contacting member) 18 made in accordance with the present invention and composed of anhydrous gypsum in which has been dispersed inorganic fibers, the sealing member being so mounted that it is in contact with the roll 17 along its length and is urged into sealing engagement with the underside of the roll 17 by means of a spring 19, with the consequence that the ingress into the atmosphere of the box 20 of the atmosphere of the lehr is prevented. The rolls 17′ provided in the box 20 can be accompanied by contacting members 18′ composed of carbon as disclosed in British Pat. No. 1,017,753. While the outer side surface of the sealing member 18 of anhydrous gypsum remote from the bath 14 is exposed to the atmosphere inside the lehr, the sealing member 18′ of carbon being located inside the non-oxidising atmosphere of the box 20 is not exposed to external atmosphere. It can thus be seen that the vanguard for protecting the non-oxidising atmosphere inside the headspace 15 from external atmosphere consists of the combination of the foremost draper 16, ribbon 11, roll 17, sealing member 18, the spring 19 which resiliently urges said sealing member into sealing engagement with the roll 17, and the housing for holding said spring 19.

We claim:

1. In an apparatus for removing from a tank-supported bath of molten metal which is protected with a protective atmosphere of non-oxidizing gas, a ribbon of glass manufactured by a float method atop said bath, and which conveys said ribbon of glass to a lehr, wherein said apparatus comprising at least one conveying roll disposed adjacent an exit end of the tank for conveying the ribbon of glass from the bath to suitable lehr means, and sealing means mounted at the underside of said roll to contact said roll along its length to prevent the ingress of external atmosphere from under the roll into the protective atmosphere, the improvement residing in said sealing means comprising an anhydrous gypsum composition having inorganic fibers dispersed therein, and thereby providing superior resistance to oxidation and heat and facilitating non-adherence of impurities from molten metal bath to the roll surface.

2. An apparatus according to claim 1 wherein said sealing means comprises an anhydrous gypsum composition having inorganic fibers dispersed therein in a ratio of from about 1 to 15% by total weight.

3. An apparatus according to claim 1 wherein said sealing means is disposed so that the external side surface remote from said bath of molten metal is exposed to external atmosphere, whereas the external side surface in proximity to the bath of molten metal is exposed to said non-oxidizing atmosphere.

4. An apparatus as defined in claim 1 wherein said sealing means comprises a composition of calcined gypsum, inorganic fibers and water.

References Cited

UNITED STATES PATENTS

| | | | |
|---|---|---|---|
| 1,273,310 | 7/1918 | Baker | 65—374 |
| 3,334,010 | 8/1967 | Moore | 65—374X |
| 3,337,320 | 8/1967 | Dyck | 65—32X |

OTHER REFERENCES

Kingery: Intro. to Ceramics, ©1960, John Wiley and Sons, Inc., pp. 24–25, 448–51.

S. LEON BASHORE, Primary Examiner

S. R. FRIEDMAN, Assistant Examiner

U.S. Cl. X.R.

65—374